(12) United States Patent
Chien (10) Patent No.: US 8,083,941 B2
(45) Date of Patent: Dec. 27, 2011

(54) CONSTRUCTION OF THE WEDGE FILTRATION MEDIA LAMINATED BY WEDGE FILTER PLATE

(76) Inventor: Huan-Jun Chien, Taipei (TW)

( * ) Notice: Subject to any disclaimer, the term of this patent is extended or adjusted under 35 U.S.C. 154(b) by 685 days.

(21) Appl. No.: 12/188,406

(22) Filed: Aug. 8, 2008

(65) Prior Publication Data

US 2009/0045130 A1 Feb. 19, 2009

(30) Foreign Application Priority Data

Aug. 17, 2007 (CN) .................... 2007 2 0146298 U (51) Int. Cl.
*B01D 29/00* (2006.01)
*B01D 35/00* (2006.01)
*B01D 29/31* (2006.01)
*B01D 29/46* (2006.01)
*B01D 25/00* (2006.01)

(52) U.S. Cl. ........ 210/314; 210/315; 210/342; 210/337; 210/338; 210/350; 210/488; 210/489; 210/483

(58) Field of Classification Search .................. 210/314, 210/315, 342, 337, 338, 350, 488, 489
See application file for complete search history.

(56) References Cited

U.S. PATENT DOCUMENTS

| 3,816,894 A * | 6/1974 | Howard et al. ............ 29/896.62 |
| 4,292,178 A * | 9/1981 | Mori et al. .................... 210/352 |
| 4,311,591 A | 1/1982 | Eimer et al. |
| 6,861,004 B2 | 3/2005 | Benenson, Jr. et al. |
| 2006/0201873 A1 | 9/2006 | Smith |
| 2006/0266695 A1 * | 11/2006 | Takahashi et al. ............ 210/483 |

FOREIGN PATENT DOCUMENTS

JP 9-24216 1/1997

* cited by examiner

*Primary Examiner* — Benjamin Kurtz
(74) *Attorney, Agent, or Firm* — McGlew and Tuttle, P.C.

(57) ABSTRACT

An improved construction of filtration media of a wedge filter provides a performance on both surface and inner filtration mechanisms with offering many times recycled use by washable functions. Particularly a wedge filter plate is used to construct a hollow cylindrical type media of wedge filter.

19 Claims, 6 Drawing Sheets

CONSTRUCTION OF THE WEDGE FILTRATION MEDIA LAMINATED BY WEDGE FILTER PLATE

BACKGROUND OF THE INVENTION

The present invention relates to an improved construction of filtration media of a wedge filter providing a performance on both surface and inner filtration mechanisms with offering many times recycled use by washable functions. Particularly a wedge filter plate is used to construct a hollow cylindrical type media of wedge filter. The whole construction of a wedge filter plate of the present invention is a flat plate with a web pattern manufactured by several different radius wedge-shaped strings of concentrically circular arc and several radial struts. The radial sedimentation chambers are established between each adjacent different radius wedge-shaped string. The sectional view of a wedge-shaped string is wedge or triangle. The thickness of a wedge-shaped string is less than a radial strut of the wedge filter plate. When wedge filter plates are laminated so as to construct a hollow cylinder, the differences of thickness become wedge-shaped apertures between each adjacent plate, and these filtering apertures of circular arc constitute a plurality of concentrically cylindrical filter screens with different radius. The sedimentation chambers are between each adjacent filter screen whereby to separate each filter screen. The mesh size of filter screen can increase progressively either from inner filter screen to outer filter screen or from outer filter screen to inner filer screen. The particles of different size are classified according to filter screens of different mesh size and left in the sedimentation chambers to accumulate filter cakes, which approaches the performance of applying a series of filter screen with different mesh size. When filter cakes accumulate excessively, it only needs to take the filtration media out, loosen the nuts at the ends of rod, and wash each individual filter plate completely. When all done, reassemble and tighten all elements up, then the filtration media can be reused.

1. Technical Field of the Invention

The present invention focus its efforts on developing an improved construction of filtration medium of a wedge filter, which particularly focus on a wedge filter plate which is used to construct a hollowly cylindrical filtration medium. The construction of the wedge filter plate is manufactured by several concentrically wedge-shaped strings of different radius that constitute concentrically multi-layered filter screens to classify the particles of different size, then deposit them in sedimentation chambers established between each adjacent filter screen and form filter cakes in order to promote the efficiency of water treatment greatly.

2. Prior Art Technique

Currently, the wedge filter is popular used in industrial fluid filter system and residential drinking waster filter system, especially a use of a device for pre-filtration to remove large particles, and the wedge filter is used widely in a need for only removing particles that are above 10s μm. The reason of the wedge filter is used widely substantially in many field is its virtues of the filter surface of easy wash, large volumes of outflow, and low filtration pressure.

Figure 1:
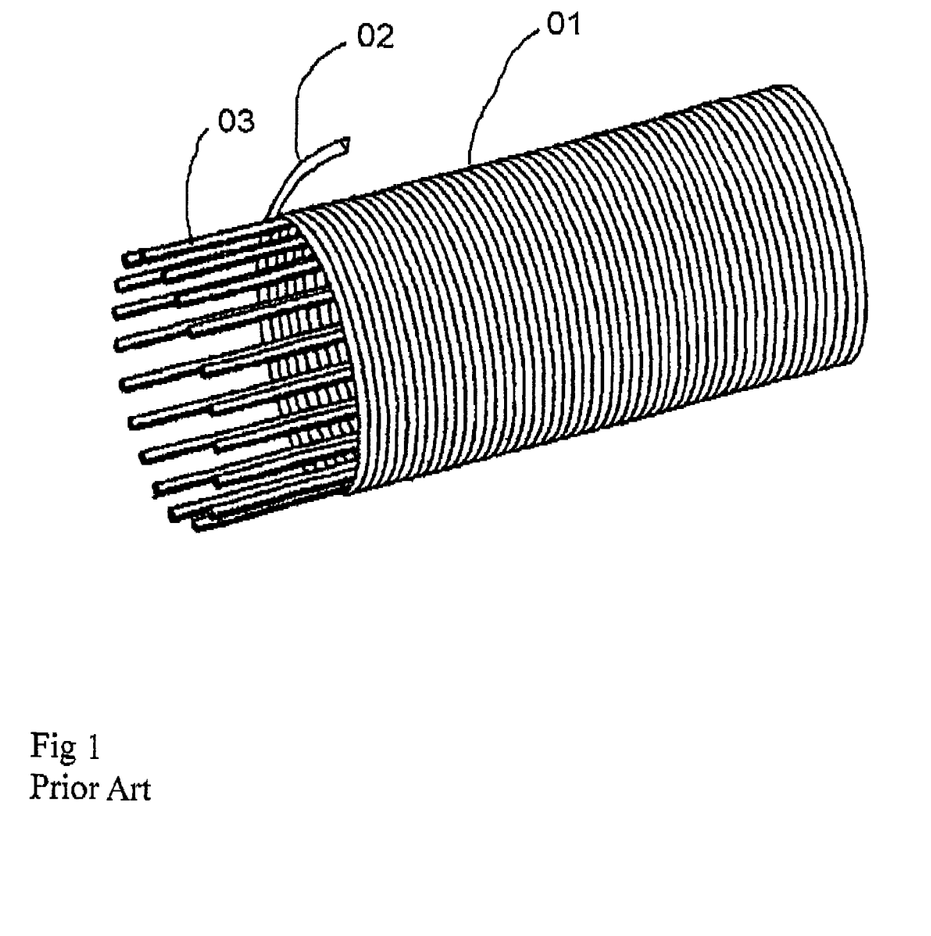
FIG. 1 illustrates a prior art technique for manufacturing a wedge filtration media.

FIG. 1 shown a wedge filtration media (01) of a filter is manufactured by winding a stainless steel wedge wire (02) in an equal interval pitch into a spiral cylinder of same radius, and there are several axial stainless steel struts (03) inside the cylinder to fix the stainless wire (02) by welding to enhance the wedge filtration media (01) strength to withstand high operation pressure during the filtration process. The mesh size of a wedge filtration media (01) is determined in course of production and based on the axial pitch between each adjacent wire, in other word, the aperture between each adjacent wire is the size of the mesh, and the minimum size is 0.025 mm. It costs expensive to make a wedge filtration media (01) because the production process is very precise. The wedge filtration media (01) adopts surface filter system that causes filter cakes to easily accumulate on the filter surfaces, which increases the filtration pressure and decreases the filtered outflow volume. Therefore, a periodical removal of filter cakes becomes an important job for the wedge filtration media (01), for this reason, the inventions of a wedge filtration media always focus on how to reduce the growth of filter cakes in order to lengthen the periodicity of re-washing. Two of most popular methods for washing the wedge filtration media (01) are hand washing and mechanical cleaning. The wedge filtration media (01) with small mesh needs a high pressure water flow or high pressure air to spray washing on reverse side by hand, but for industrial purpose of large volume of flow and continuous filtration usually employ the cleaning mechanism, such as:

1. A use of parallel filtration mechanism to reduce filter cakes growth, U.S. Pat. No. 4,311,591.
2. A use of a self-cleaning brush mechanism to remove filter cakes, U.S. Pat. No. 6,861,004 B2.
3. A use of rotational bar to shake the filtration media continuously to reduce filter cakes growth, JP9024216.
4. A device of synchronous reverse washing for the filtration media cylindrical surface.

Since the mesh size of the wedge filtration media (01) is uniform, thus the tempo and the thickness of filter cakes accumulation become important factors in affecting the filtration efficiency. The cleaning methods described above are rarely employed for residential purpose or other medium and small size filter system because of the facilities cost and the filtered flow volume.

Besides the methods described above, increasing the filtering surface is also a popular method, such as:

1. A use of a series of wedge filters with different mesh size to lengthen the periodicity of washing and promote the efficiency of filter system.
2. A use of concentric C-shaped wedge filtration media, US2006/0201873 A1.

From prior art technique described above, there are some solutions were addressed successively for the wedge filter, but for residential purpose of medium and small size still has some issues needed improvement as the following:

1. A wedge filtration media is manufactured by winding a stainless steel wedge wire and formed by welding, the process of production is high precise and costs expensive.
2. The surface filter system of uniform mesh size causes filter cakes easily formed and increasing filtration pressure needed. Therefore, applying a series of wedge filters of different mesh size becomes a necessary method for lengthening the periodicity of washing.
3. A wedge filtration media of small mesh has a need of applying reverse high pressure water flow or high pressure air to spray washing on reverse side or use a small brush to clean.

The reason of a conventional wedge filter till popular now is its virtues of strength, large volume of flow, and reusability. The present invention not only retains these previous advantages, but also has developed several innovative virtues, such as easy production, low cost, series filtration mechanism to reduce filter cakes growth and easy to wash, so that the wedge filter of the present invention will be helpful for end user and more widely application.

SUMMARY OF THE INVENTION

According to the issues of prior art technique described above, the present invention has developed an innovative design to improve construction of a wedge filtration media as the following:

The present invention addressed an improved construction of a wedge filtration media that improve not only with surface but also inner filtration mechanism, and washable function, more particularly, a wedge filter plate which used to construct a hollowly cylindrical wedge filtration media. The construction of the wedge filter plate of the present invention is a flat plate with a web pattern manufactured by several different radius wedge-shaped strings of concentrically circular arc and several radial struts.

Another object of the present invention is to provide an improved construction of a wedge filtration media which is simple construction, easy production, low cost and high strength in order to be applied under high operation pressure.

A more object of the present invention is to provide such an improved construction of a wedge filtration media which can easily dismantle the wedge filtration media to separate each wedge filter plate completely and apply a simple method to clean.

A more object of the present invention is to provide such an improved construction of a wedge filtration media with back washable function, which doesn't need to dismantle the wedge filtration media but just open a drain valve at the bottom of the filter casing with suitable pipe connected when backwash is needed.

DETAILED DESCRIPTION OF THE INVENTION

The present invention provides an innovative design for an improved construction of a wedge filtration media wherein the wedge filter plate is manufactured as a web pattern by several strings of concentrically circular arc radiating outward from the hollow, and comprising several different radius wedge-shaped strings of concentrically circular arc, several radial struts, a hollow at central part, and radial sedimentation chambers between each adjacent different radius wedge-shaped string. When wedge filter plates are overlapping, the spaces between each adjacent wedge filter plate become the apertures that perform the filter function. The characters are disclosed in detail below:

There are several different radius wedge-shaped strings of circular arc, and a sectional view of a string is wedge or triangle, the long-axis X and the short-axis Y of the section are perpendicular to each other, the long-axis X of the section is perpendicular to the central line of the hollow and presents the length of the section, the short-axis Y of the section is parallel to the central line of the hollow and presents the thickness of the section. Every different radius wedge-shaped string has different thickness and is thinner than a wedge filter plate. A radial strut has same thickness as a wedge filter plate. When wedge filter plates are overlapping, the difference of the thickness between a wedge-shaped string and a wedge filter plate becomes the filtering aperture between each adjacent wedge filter plate, and the sizes of the filtering apertures are the sizes of the meshes of the wedge filtration media. The aperture resulting from wedge filter plates overlapping is formed from the lower side of an upper wedge-shaped string and the upper side of a lower wedge-shaped string and has a narrow throat for entrance and a wide opening for exit. There are several different radius filtering apertures of circular arc constitute a series of concentrically cylindrical filter screens of different radius inside the wedge filtration media. The radial sedimentation chambers are established between each adjacent different radius wedge-shaped string, so that the sedimentation chambers link the apertures together and make combinations in series, and creating several series of filter systems of different mesh size from the outer to the inner, therefore the particles larger than the apertures will be captured and left in the sedimentation chambers. The hollow is located in the center of a wedge filter plate and provides a passageway for a fluid flow when wedge filter plates are overlapping.

EMBODIMENT OF THE INVENTION

Figure 2:
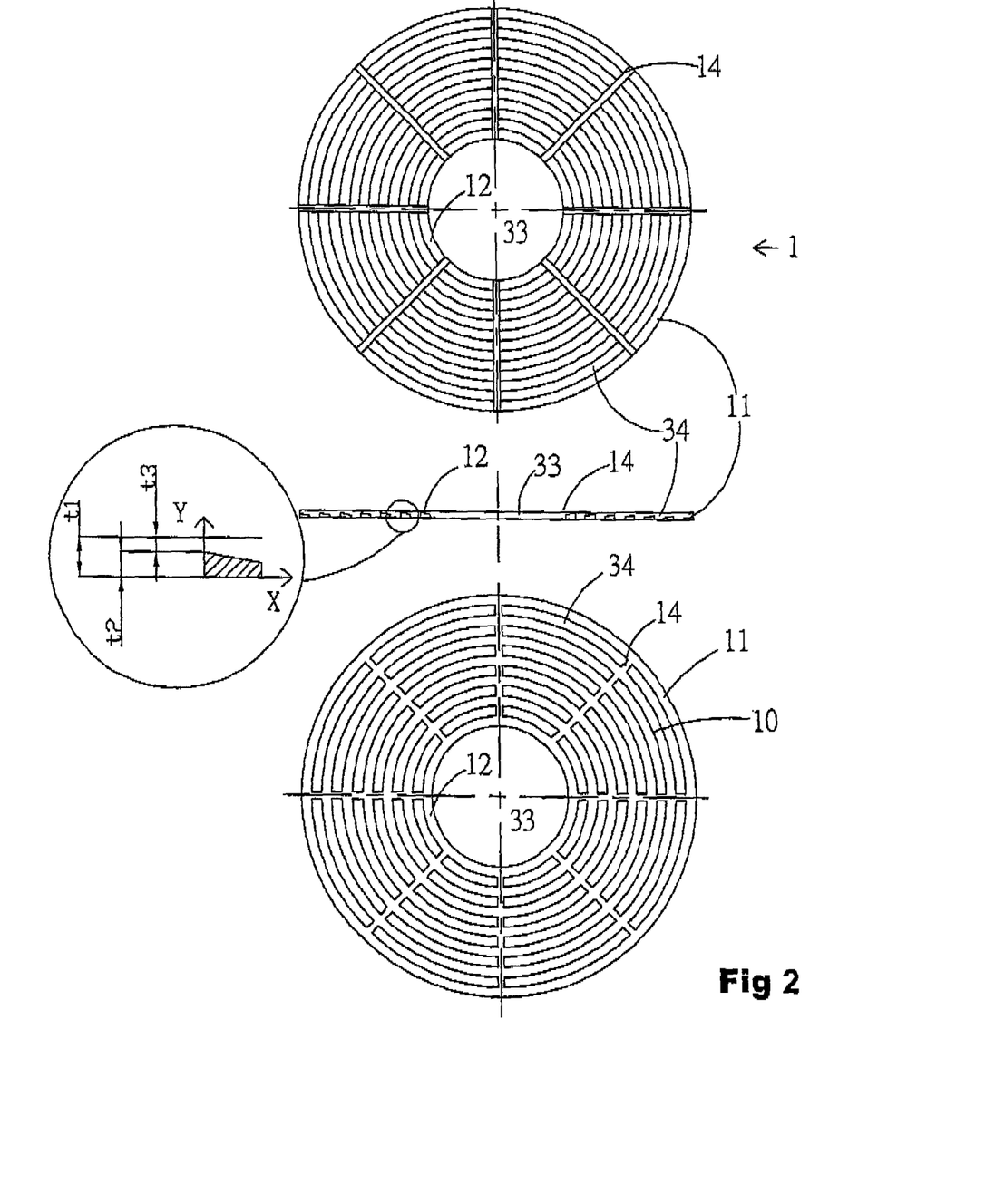
FIG. 2 illustrates a sectional view of a construction of a wedge filter plate of the present invention.

As illustrated as the following description to further explain the features, purpose and function of the present invention:

FIG. 2 is a detail of the construction of a wedge filter plate (1) of the present invention. The construction of a wedge filter plate (1) is manufactured by several different radius wedge-shaped strings (10) of concentrically circular arc and several radial struts (14), at central part has a hollow (33), and radial sedimentation chambers (34) between each adjacent different radius wedge-shaped string, therefore, the wedge filter plate (1) is manufactured as a porous web pattern by wedge-shaped strings of concentrically circular arc radiating outward from the hollow. A sectional view of a wedge-shaped string (10) is wedge or triangle, the long-axis (X) of the section points to the hollow (33), the short-axis (Y) of the section is parallel to the central line of the hollow (33). Every wedge-shaped string (10) has different thickness (t2). A radial struts (14) has same thickness (t1) as a wedge filter plate (1). There is a difference (t3) between a wedge-shaped string and a wedge filter plate (1). The outermost wedge-shaped string (11) has least thickness, the innermost wedge-shaped string (12) has most thickness, and every wedge-shaped string (10) is thinner than a wedge filter plate (1).

Figure 3:
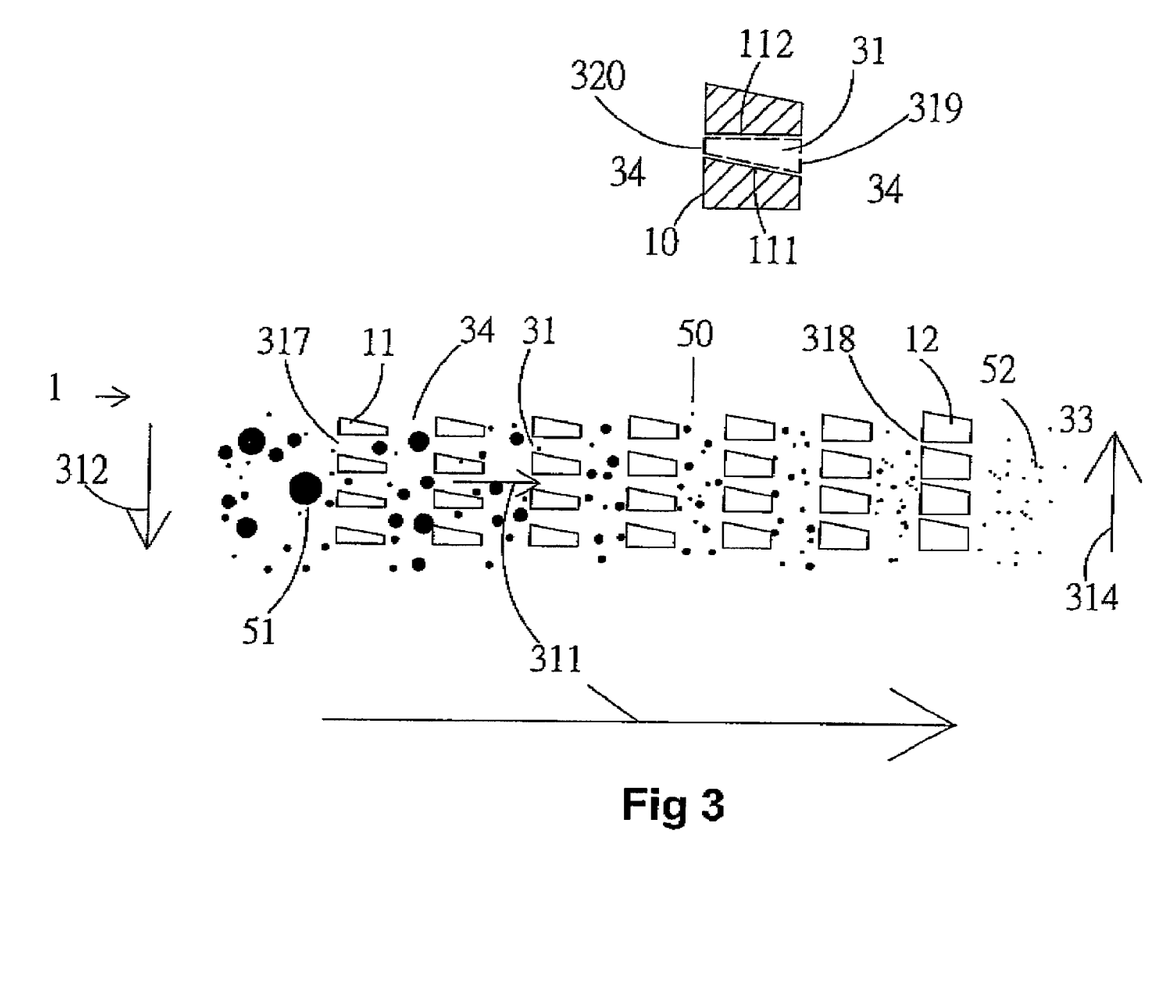
FIG. 3 is an enlarged view of filtration mechanism of the filter system of the present invention

As illustrated in FIG. 2 and FIG. 3 in the present invention, when several wedge filter plates (1) are overlapping, the wedge-shaped filtering apertures (31) between each adjacent wedge filter plate (1) result from the differences (t3) of thickness and are the sizes of the filter meshes. These wedge-shaped filtering apertures (31) resulting from the differences (t3) of wedge-shaped strings of concentrically circular arc (10) constitute a plurality of concentrically cylindrical wedge filter screens. While two adjacent wedge filter plates are overlapping, the lower side (112) of the upper wedge-shaped string and the upper side (111) of the lower wedge-shaped string become the upper side and the lower side of the wedge-shaped aperture. The narrow throat (320) of the wedge-shaped aperture has the smallest space, and the wide opening (319) of the wedge-shaped aperture has the biggest space. The wide opening (319) faces inwardly the hollow (33). The outermost wedge-shaped string (11) has most difference (t3), so its filtering aperture throat (317) is the biggest; the innermost wedge-shaped string (12) has least difference (t3), so its filtering aperture throat (318) is the smallest, and the minimum size of a filtering aperture is 0.025 mm.

As shown in FIG. 3 in the present invention, the arrow (312) indicates the direction of an unfiltered fluid flow contains particles entering from the inlet of enclosure. The big particles (51) larger than the filtering aperture (317) are separated by the filtering aperture (317) that is established by the outermost wedge-shaped string (11) and deposited on the exterior surface of the filtration media (22). Smaller particle (50) has passed through the filtering aperture (317) will continually flow to the hollow (33) of the wedge filtration media according to the direction of arrow (311). After being classified by multi-layered filtering apertures (31), the extremely small particles (52) will pass through the smallest filtering aperture (318) and arrive at the hollow (33) of the wedge filtration media, then flow out according to the direction of arrow (314). A large percentage of particles (50) are captured because their sizes are larger than one of the filtering apertures (31) and left in sedimentation chambers (34). When more and more particles (50) are deposited in sedimentation chambers (34), filter cakes are gradually growing and accumulating, and a need for filtration pressure is increasing too. When sedimentation chambers are full of filter cakes, only to wash the wedge filtration media (22), then can reuse it. This filter system approaches the performance as same as applying a series of wedge filters of different mesh size, that ensures the outflow volume will not decrease deeply during a period because of particles blocking up and the filtration pressure will not increase rapidly also.

Figure 4:
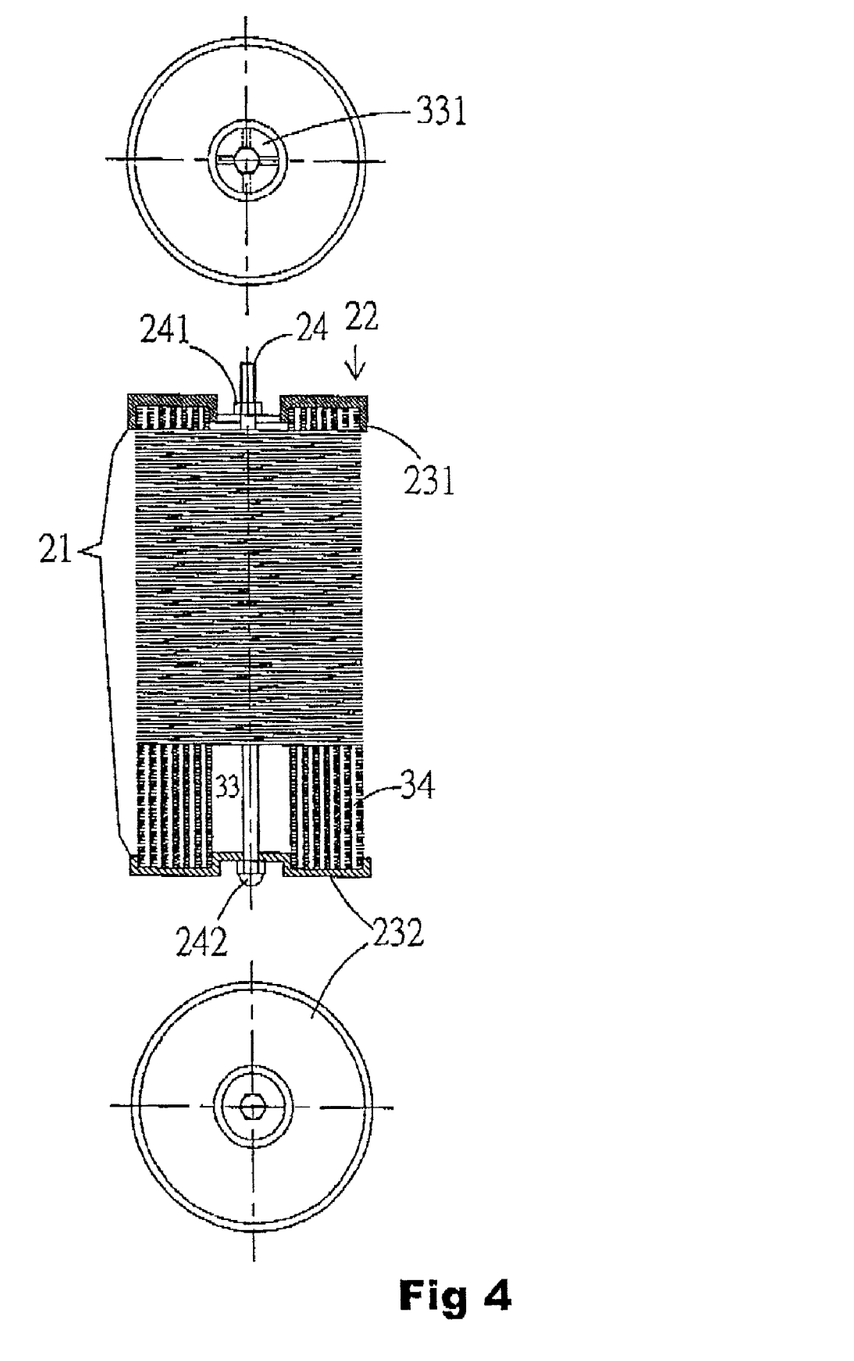
FIG. 4 is a construction view of the wedge filtration media of the present invention

FIG. 4 is a part cross section view of a wedge filtration media (22) of the present invention, which is constructed from laminated wedge filter plates (1). The wedge filtration media (22) shown in FIG. 4 comprises a fixed round plate (231) at the top, a fixed round plate (232) at the bottom, and a hollow cylinder (21) between them constructed from laminated several wedge filter plates (1) of certain length. There is a fixed rod (24) at the hollow (33) of the hollow cylinder (21). The both ends of rod (24) pass through a top fixed round plate (231) and a bottom fixed round plate (232), and each end has a tightened nut (241) and (242) to tighten up all elements of the wedge filtration media (22). At central part of a top fixed round plate (231) has a concave opening (331) where is an exit of the wedge filtration media (22) to combine with the downward elongation (64) of an exit at a top cap (65) of the wedge filter (60), shown on FIG. 6. The bottom fixed round plate (232) can completely isolated an unfiltered fluid flow from entering the hollow (33) of the wedge filtration media (22).

Figure 5:
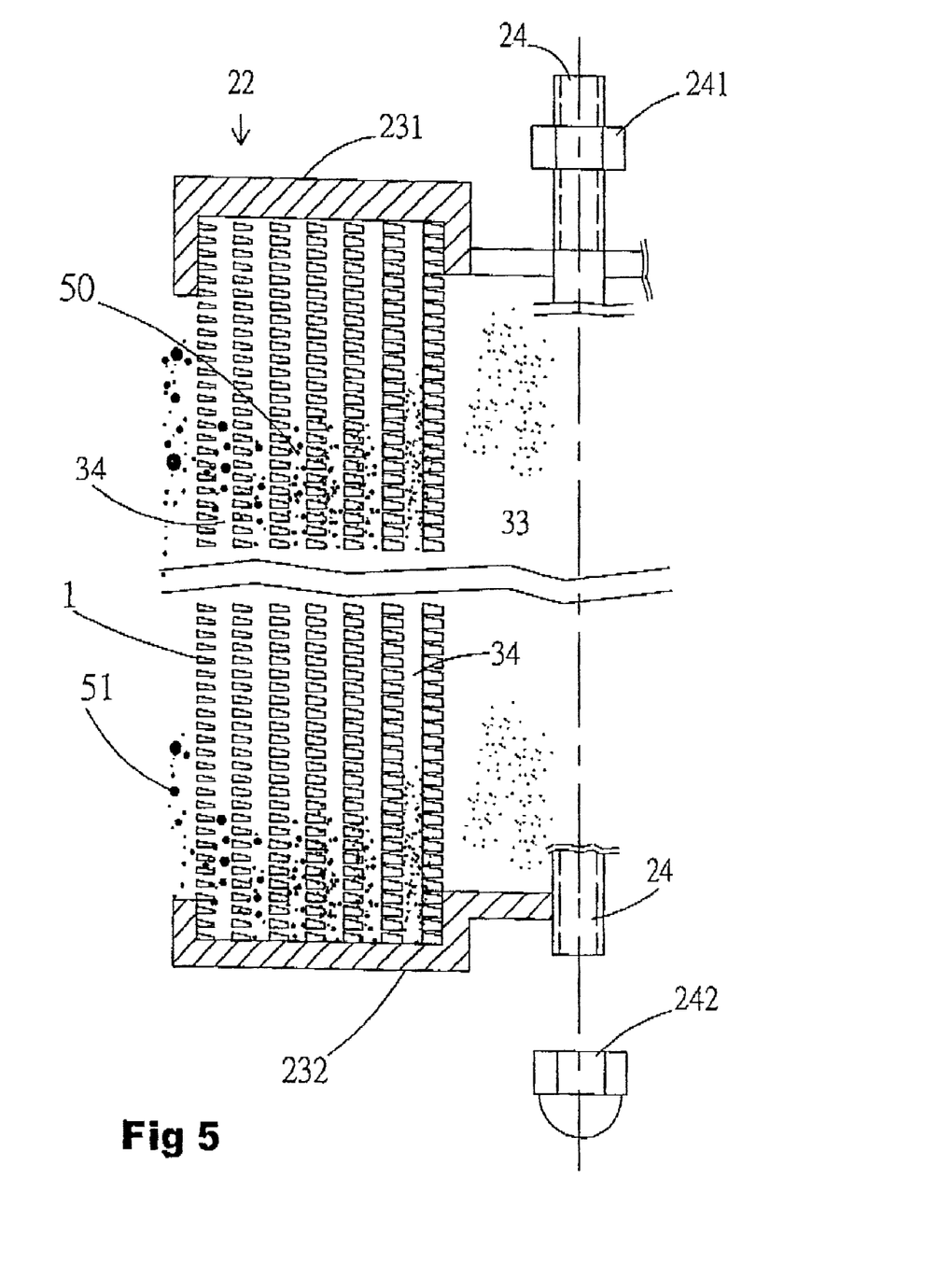
FIG. 5 is a view of disassembled process of the wedge filtration media of the present invention.

FIG. 5 illustrates one of cleaning processes of a wedge filtration media (22) of the present invention. First, taking the wedge filtration media (22) out from the wedge filter (60), then loosing the tightened nuts (241) and (242) at the both fixed round plates (231) and (232) at ends of rod (24), so that all elements of the wedge filtration media (22) are dismantled, each wedge filter plate (1) is completely separated piece by piece, and particles (50) are easy to be removed from sedimentation chambers (34).

Figure 6:
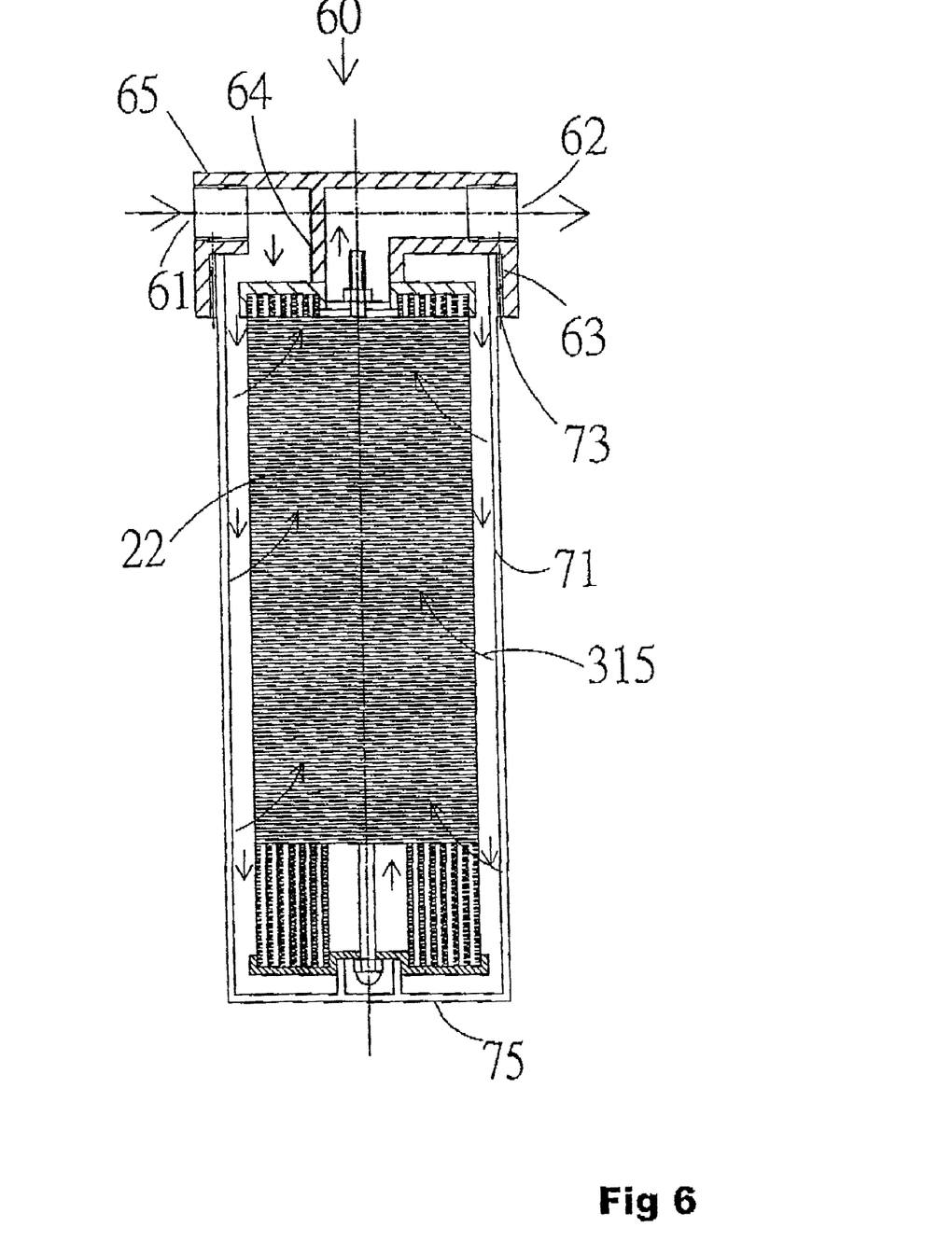
FIG. 6 is a practical example for the applying use of the wedge filter of the present invention

In FIG. 6, showing a wedge filtration media (22) of the present invention is installed inside a wedge filter (60). There is a hollowly cylindrical wedge filtration media (22) is constructed from laminated wedge filter plates (1). A top cap (65) of the wedge filter (60) has an inlet (61) and an outlet (62) with the downward elongation (64) which connected with an exit of the wedge filtration media (22). The threads (73) of casing (71) of the wedge filter (60) hooks up with the threads (63) of the top cap (65). The wedge filtration media (22) is installed in and fixed at the bottom (75) of the casing (71). The fluid flow moves forward according to the direction of arrow (315).

The wedge filtration media of the present invention has several features as the following:

1. The wedge filter plate is formed by a model directly, so the cost is low. When wedge filter plates are laminated and construct a hollowly cylindrical wedge filtration media, the strength of construction has been largely enhanced and able to bear high operation pressure.
2. There are several cylindrical filter screens and sedimentation chambers established by several series wedge-shaped strings of concentrically circular arc, which perform a result that employ a series of multi-layered filter screens from the exterior to the interior and increase the filter efficiency. The mesh size of the filter screen increases progressively from inner filter screen to outer filter screen to classify particles of different size, so that a wide range distribution of filter cakes within the wedge filtration media from the exterior to the interior to lengthen the periodicity of filtration and maintain low filtration pressure.
3. When the filter cakes need to be removed, only loosen the nuts which fixed at the ends of rod, separate and wash each wedge filter plate piece by piece completely, that will not have a washing dead space and don't need a high pressure water flow or a high pressure air to wash.

Conclusion of above descriptions, the present invention obviously possesses the above efficiencies and practical values, and can promote the benefit of economic values, so the present invention is an excellent innovation indeed. There is no same or similar product in this technical field has been used in public, so the present invention is qualified for a claim for applying the patent. The above descriptions just only are one of practical examples of the present invention that could not be a limit to the filed in the present invention. Whatever an adaptation, an alternation or a modification as long as bases on the patent field of the present invention and still retains the essence of the present invention or not beyond the spirit and the field of the present invention substantially should be viewed as the further practical situation of the present invention.

DESCRIPTION OF THE SYMBOLS FOR THE ELEMENTS IN THE DRAWING

| | | | |
|---|---|---|---|
| 01 | A Wedge Filtration Medium | 50 | Particles |
| 02 | A Stainless Steel Wedge-Shaped Wire | 51 | The Biggest Particles On Out Surface of The Filtration Medium |
| 03 | Axial Stainless Steel Struts | 52 | The Extremely Small Particles In The Hollow of A Filtration media |
| 1 | A Wedge Filter Plate | 60 | A Wedge Filter |
| 10 | The Wedge-Shaped String | 61 | Inlet Of A Wedge Filter |
| 11 | The Outermost Wedge-Shaped String | 62 | Outlet Of A Wedge Filter |
| 111 | The Upper Side Of The Sectional View Of A Wedge-Shaped Aperture | 63 | The Threads OF A Top Cap Of A Wedge Filter |
| 112 | The Low Side Of The Sectional View Of A Wedge-Shaped Aperture | 64 | The Downward Elongation Of Outlet At Top Cap Of A Wedge Filter |
| 12 | The Innermost Wedge-Shaped String | 71 | A Wedge Filter Casing |
| 14 | The Radial Struts | 73 | The Opening Threads OF A Wedge Filter Casing |
| 21 | A Hollow Cylinder By | 75 | The Bottom Of A Wedge |

DESCRIPTION OF THE SYMBOLS FOR THE ELEMENTS IN THE DRAWING

| | Laminated Wedge Filter Plates | | Filter Casing |
|---|---|---|---|
| 22 | A Filtration Medium By Laminated Wedge Filter Plates | t1 | The Thickness Of A Wedge Filter Plate Same As Radial Struts Thickness |
| 231 | A Fixed Round Plate At The Top | t2 | The Thickness Of A Wedge-Shaped String |
| 232 | A Fixed Round Plate At The Bottom | t3 | The Differential Thickness Between Radial Struts and Wedge-Shaped String |
| 24 | A Fixed Screw Rod | X | The X-Axis Of The Section Of A Wedge-Shaped String Is Orthogonal To The Central Line |
| 241 | A Tightened Nut | Y | The Y-Axis Of The Section Of A Wedge-Shaped String Is Parallel To The Central Line |
| 242 | A Tightened Nut | | |
| 31 | The Wedge-Shaped Apertures | | |
| 311 | The Direction Of A Fluid Flow | | |
| 312 | The Direction Of A Fluid Flow | | |
| 314 | The Direction Of A Fluid Flow | | |
| 315 | The Direction Of A Fluid Flow | | |
| 317 | The Outermost Wedge-Shaped Filtering Aperture | | |
| 318 | The Innermost Wedge-Shaped Filtering Aperture | | |
| 319 | A Wide Opening Of A Wedge-Shaped Filtering Aperture | | |
| 320 | A Narrow Throat Of A Wedge-Shaped Filtering Aperture | | |
| 33 | The Central Hollow of A Wedge Filter Plate | | |
| 331 | The Opening of A Top Fixed Round Plate | | |
| 34 | The Sedimentation Chambers Between Two Wedge-Shaped Strings | | |

What is claimed is:

1. A wedge filtration media, comprising:
a plurality of wedge filter plates, each of said wedge filter plates comprising a hollow portion arranged at a center thereof, several wedge strings of concentrically circular arc radiating outward from said hollow portion, several radial struts, and radial sedimentation chambers, said several wedge strings of concentrically circular arc comprising several different radius wedge-shaped strings of concentrically circular arc, said radial sedimentation chambers being arranged between each adjacent different radius wedge-shaped string, said several wedge strings of concentrically circular arc and said several radial struts forming a porous web pattern of one of said wedge filter plates, each of said radial struts having a radial strut thickness, said radial strut thickness being substantially equal to a thickness of one or more of said wedge filter plates, each of said several wedge strings comprising a wedge string cross section, said wedge string cross section being in a shape of a wedge or a triangle, said wedge string cross section comprising a long-axis and a short-axis, said long-axis being perpendicular to said short-axis, said long-axis being perpendicular to a central line of said hollow portion, said long-axis defining a length of said wedge string cross section, said short-axis being parallel to the central line of the hollow section, said short-axis defining a thickness of said wedge string cross section, each of said different radius wedge-shaped string having a radius wedge-shaped string cross section, said radius wedge-shaped string cross section of each of said several different radius wedge-shaped strings of concentrically circular arc having a thickness that is different from a thickness of another one of said several different radius wedge-shaped strings of concentrically circular arc, said thickness of each of said several different radius wedge-shaped strings of concentrically circular arc being less than one or more of said wedge filter plates, wherein a lower side of one of said several different radius wedge-shaped strings of concentrically circular arc and an adjacent one of said several different radius wedge-shaped strings of concentrically circular arc define a plurality of different radius filtering apertures of circular arc, wherein each of said filtering apertures has a dimension equal to a difference between said thickness of one of said several different radius wedge-shaped strings and one of said wedge filter plates, each of said filtering apertures having a throat for entrance and an exit opening for exit, said throat having a dimension that is less than a dimension of said exit opening, said different radius filtering apertures of circular arc defining a plurality of series concentrically cylindrical filter screens of different radius inside the wedge filtration media, said radial sedimentation chambers being established between each adjacent different radius wedge-shaped string such that the radial sedimentation chambers link said different radius filtering apertures together and in series, said different radius filtering apertures and said radial sedimentation chambers defining several series of filter systems of different mesh size from an outer portion of said one of said wedge filter plates and said adjacent wedge filter plate to an inner portion of said one of said wedge filter plates and said adjacent wedge filter plate, wherein particles having a dimension greater than one or more of said different radius filtering apertures is left in one of the radial sedimentation chambers, said hollow portion providing a passageway for a fluid flow.

2. The construction of the wedge filtration media as claimed in claim 1, wherein said exit opening faces inwardly, in a direction of said hollow portion, wherein an incoming fluid flow enters said hollow portion, said several wedge strings of concentrically circular arc comprising an outmost wedge-shaped string and an innermost wedge-shaped string, said outmost wedge-shaped string having an outmost wedge-shaped string thickness, and the innermost wedge-shaped string having an innermost wedge-shaped string thickness, said innermost wedge-shaped string thickness being greater than said outmost wedge-shaped string thickness, wherein a thickness of each of said several wedge strings increases from said outmost wedge-shaped string to said innermost wedge-shaped string, said outmost wedge-shaped string defining at least a portion of one of said filtering apertures and said innermost wedge-shaped string defining at least a portion of another one of said filtering apertures, said dimension of said one of said filtering apertures being greater than said dimension of said another one of said filtering apertures, wherein a minimum size of said filtering apertures is 0.025mm.

3. The construction of the wedge filtration media as claimed in claim 1, wherein said exit opening faces outwardly an enclosure of wedge filtration media, wherein an incoming fluid flow enters from the central said hollow portion of the wedge filtration media to the enclosure, said several wedge strings of concentrically circular arc comprising an outmost wedge-shaped string having an outmost wedge-shaped string thickness and an innermost wedge-shaped string having an innermost wedge-shaped string thickness, said outmost wedge-shaped string thickness being greater than said innermost wedge-shaped string thickness, wherein a thickness of said several wedge strings increases progressively from said innermost wedge-shaped string to said outmost wedge-shaped string, said outmost wedge-shaped string forming at least a portion of a smallest filtering aperture and said innermost wedge-shaped string forming at least a portion of a biggest filtering aperture, wherein a minimum size of said filtering apertures is 0.025mm.

4. A wedge filtration media, comprising:
a first wedge filter plate comprising a first wedge filter plate hollow portion, a plurality of first wedge-shaped strings of concentrically circular arc extending outward from said first wedge filter plate hollow portion, a plurality of first radial struts and a plurality of first sedimentation chambers, each of said first radial struts extending in a radial direction with respect to a central axis of said first hollow portion, each of said first sedimentation chambers being arranged between adjacent first wedge-shaped strings, each of said first wedge-shaped strings having a first wedge-shaped string thickness, said first wedge-shaped string thickness of each of said first wedge-shaped strings being different from said first wedge-shaped string thickness of another one of said first wedge-shaped strings;
a second wedge filter plate comprising a bottom surface, said bottom surface and each of said plurality of first wedge-shaped strings defining a plurality of filter apertures, each of said filter apertures having an entry opening and an exit opening, said entry opening being in communication with said exit opening, wherein a dimension of said entry opening of each of said filter apertures is greater than a dimension of said entry opening of a consecutive filter aperture, each of said first sedimentation chambers being in communication with one or more of said filter apertures.

5. A wedge filtration media in accordance with claim 4, wherein said second wedge filter plate comprises a second wedge filter plate hollow portion, a plurality of second wedge-shaped strings of concentrically circular arc extending outward from said second wedge filter plate hollow portion, a plurality of second radial struts and a plurality of second sedimentation chambers, each of said second radial struts extending in a radial direction with respect to a central axis of said second hollow portion, each of said second sedimentation chambers being arranged between adjacent second wedge-shaped strings, each of said second wedge-shaped strings having a second wedge-shaped string thickness, said second wedge-shaped string thickness of each of said second wedge-shaped strings being different from said second wedge-shaped string thickness of another one of said second wedge-shaped strings, one or more of said second sedimentation chambers being in communication with one or more of said first sedimentation chambers and one or more of said first filter apertures.

6. A wedge filtration media in accordance with claim 5, wherein each of said first radial struts have a first radial strut thickness, said first radial strut thickness being substantially equal to a thickness of said first wedge filter plate, each of said first wedge-shaped strings comprising a first wedge string cross section, said first wedge string cross section being in a shape of a first wedge or a first triangle, said first wedge string cross section comprising a first long-axis and a first short-axis, said first long-axis being perpendicular to said first short-axis, said first long-axis being perpendicular to said central axis of said first hollow portion, said first long-axis defining a length of said first wedge string cross section, said first short-axis being parallel to the central axis of said first wedge filter plate hollow section, said first short-axis defining a thickness of said first wedge string cross section, said thickness of each of said first wedge-shaped strings being less than a thickness of said first wedge filter plate, each of said filtering apertures having a dimension equal to a difference between said thickness of one of said first wedge-shaped strings and said thickness of said first wedge filter plate, said entry opening of said filtering apertures having a dimension that is less than a dimension of said exit opening of said filtering apertures, wherein particles having a dimension greater than one or more of said filtering apertures is left in one of the first radial sedimentation chambers, said first wedge plate hollow portion defining a passageway for a fluid flow.

7. A wedge filtration media in accordance with claim 6, wherein each of said second radial struts have a second radial strut thickness, said second radial strut thickness being substantially equal to said thickness of said second wedge filter plate, each of said second wedge-shaped strings comprising a second wedge string cross section, said second wedge string cross section being in a shape of a second wedge or a second triangle, said second wedge string cross section comprising a second long-axis and a second short-axis, said second long-axis being perpendicular to said second short-axis, said second long-axis being perpendicular to said central axis of said second wedge filter plate hollow portion, said second long-axis defining a length of said second wedge string cross section, said second short-axis being parallel to the central axis of said second wedge filter plate hollow section, said second short-axis defining a thickness of said second wedge string cross section, said thickness of each of said second wedge-shaped strings being less than a thickness of said second wedge filter plate, said second wedge plate hollow portion defining a passageway for a fluid flow.

8. A wedge filtration media as claimed in claim 4, wherein said exit opening faces inwardly in a direction of said first wedge filter plate hollow portion, wherein an incoming fluid flow enters said first wedge filter plate hollow portion, said first wedge-shaped strings comprising an outmost wedge-shaped string and an innermost wedge-shaped string, said outmost wedge-shaped string having an outmost wedge-shaped string thickness, and the innermost wedge-shaped string having an innermost wedge-shaped string thickness, said innermost wedge-shaped string thickness being greater than a thickness of each of another of said first wedge-shaped strings and said outmost wedge-shaped string thickness being less than said thickness of each of another of said first wedge-shaped strings, wherein the thickness of each of said first wedge-shape strings increases from said outmost wedge-shaped string to said innermost wedge-shaped string, said outmost wedge-shaped string defining at least a portion of one of said filtering apertures and said innermost wedge-shaped string defining at least a portion of another one of said filtering apertures, wherein a dimension of said one of said filtering apertures is greater than a dimension of said another one of said filtering apertures, wherein a minimum size of said filtering apertures is 0.025mm.

9. A wedge filtration media in accordance with claim 8, wherein said second wedge-shaped strings comprise a second outmost wedge-shaped string and a second innermost wedge-shaped string, said second outmost wedge-shaped string having a second outmost wedge-shaped string thickness, and the second innermost wedge-shaped string having a second innermost wedge-shaped string thickness, wherein a thickness of each of said second wedge-shapes strings is less than said second innermost wedge-shaped string thickness and said second outmost wedge-shaped string thickness is less than said thickness of each of said second wedge-shaped strings, wherein the thickness of each of said second wedge-shaped strings increases from said second outmost wedge-shaped string to said second innermost wedge-shaped string.

10. A wedge filtration media in accordance with claim 4, wherein said first wedge-shaped strings comprise an outmost wedge-shaped string having an outmost wedge-shaped string thickness and an innermost wedge-shaped string having an innermost wedge-shaped shaped string thickness, said outmost wedge-shaped string thickness being greater than a thickness of each of another of said first wedge-shaped strings and said innermost wedge-shaped string thickness being less than said thickness of each of another of said first wedge-shaped strings, wherein a thickness of first wedge-shaped strings increases progressively from said innermost wedge-shaped string to said outmost wedge-shaped string, said outmost wedge-shaped string forming at least a portion of a smallest filtering aperture and said innermost wedge-shaped string forming at least a portion of a biggest filtering aperture, wherein a minimum size of said filtering apertures is 0.025mm.

11. A wedge filtration media in accordance with claim 10, wherein said second wedge-shaped strings comprise a second outmost wedge-shaped string having a second outmost wedge-shaped string thickness and a second innermost wedge-shaped string having a second innermost wedge-shaped string thickness, said second outmost wedge-shaped string thickness being greater than a thickness of each of another of said second wedge-shaped strings and said second innermost wedge-shaped string thickness being less than said thickness of each of another of said second wedge-shaped strings, wherein a thickness of second wedge-shaped strings increases progressively from said second innermost wedge-shaped string to said second outmost wedge-shaped string.

12. A wedge filtration media, comprising:
a first wedge filter plate comprising a first wedge filter plate hollow portion, a plurality of first wedge-shaped strings of concentrically circular arc extending outward from said first wedge filter plate hollow portion, a plurality of first radial struts and a plurality of first sedimentation chambers, each of said first radial struts extending in a radial direction with respect to a central axis of said first wedge filter plate, each of said first sedimentation chambers being arranged between adjacent first wedge-shaped strings, each of said first wedge-shaped strings having a first wedge-shaped string thickness, said first wedge-shaped string thickness of each of said first wedge-shaped strings being different from said first wedge-shaped string thickness of another one of said first wedge-shaped strings;
a second wedge filter plate comprising a second bottom surface, said second bottom surface being located at a spaced location from each of said plurality of first wedge-shaped strings to define a plurality of filter apertures, each of said filter apertures having an entry opening and an exit opening, said entry opening being in communication with said exit opening, wherein a dimension of said entry opening of filter apertures decreases based on a radial position of said first-wedge-shaped strings relative to said central axis of said first wedge filter plate, wherein said dimension of said entry opening of a first one of said filter apertures is greater than said dimension of said entry opening of a second one of said filter apertures, said second one of said filter apertures being located at a first distance from said central axis of said first wedge filter plate, said first one of said filter apertures being located at a second distance from said central axis of said first wedge filter plate, said first distance being greater than said second distance, each of said first sedimentation chambers being in communication with one or more of said filter apertures.

13. A wedge filtration media in accordance with claim 12, wherein said second wedge filter plate comprises a second wedge filter plate hollow portion, a plurality of second wedge-shaped strings of concentrically circular arc extending outward from said second wedge filter plate hollow portion, a plurality of second radial struts and a plurality of second sedimentation chambers, each of said second radial struts extending in a radial direction with respect to a central axis of said second hollow portion, each of said second sedimentation chambers being arranged between adjacent second wedge-shaped strings, each of said second wedge-shaped strings having a second wedge-shaped string thickness, said second wedge-shaped string thickness of each of said second wedge-shaped strings being different from said second wedge-shaped string thickness of another one of said second wedge-shaped strings, one or more of said second sedimentation chambers being in communication with one or more of said first sedimentation chambers and one or more of said first filter apertures.

14. A wedge filtration media in accordance with claim 13, wherein each of said first radial struts have a first radial strut thickness, said first radial strut thickness being substantially equal to a thickness of said first wedge filter plate, each of said first wedge-shaped strings comprising a first wedge string cross section, said first wedge string cross section being in a shape of a first wedge or a first triangle, said first wedge string cross section comprising a first long-axis and a first short-axis, said first long-axis being perpendicular to said first short-axis, said first long-axis being perpendicular to said central axis of said first hollow portion, said first long-axis defining a length of said first wedge string cross section, said first short-axis being parallel to the central axis of said first wedge filter plate hollow section, said first short-axis defining a thickness of said first wedge string cross section, said thickness of each of said first wedge-shaped strings being less than a thickness of said first wedge filter plate, each of said filtering apertures having a dimension equal to a difference between said thickness of one of said first wedge-shaped strings and said thickness of said first wedge filter plate, said entry opening of said filtering apertures having a dimension that is less than a dimension of said exit opening of said filtering apertures, wherein particles having a dimension greater than one or more of said filtering apertures is left in one of the first radial sedimentation chambers, said first wedge plate hollow portion defining a passageway for a fluid flow.

15. A wedge filtration media in accordance with claim 14, wherein each of said second radial struts have a second radial strut thickness, said second radial strut thickness being substantially equal to said thickness of said second wedge filter plate, each of said second wedge-shaped strings comprising a second wedge string cross section, said second wedge string cross section being in a shape of a second wedge or a second triangle, said second wedge string cross section comprising a second long-axis and a second short-axis, said second long-axis being perpendicular to said second short-axis, said second long-axis being perpendicular to said central axis of said second wedge filter plate hollow portion, said second long-axis defining a length of said second wedge string cross section, said second short-axis being parallel to the central axis of said second wedge filter plate hollow section, said second short-axis defining a thickness of said second wedge string cross section, said thickness of each of said second wedge-shaped strings being less than a thickness of said second wedge filter plate, said second wedge plate hollow portion defining a passageway for a fluid flow.

16. A wedge filtration media as claimed in claim 12, wherein said exit opening faces inwardly, in a direction of said first wedge filter plate hollow portion, wherein an incoming fluid flow enters said first wedge filter plate hollow portion, said first wedge-shaped strings comprising an outmost wedge-shaped string and an innermost wedge-shaped string, said outmost wedge-shaped string having an outmost wedge-shaped string thickness, and the innermost wedge-shaped string having an innermost wedge-shaped string thickness, said innermost wedge-shaped string thickness being greater than a thickness of each of another of said first wedge-shaped strings and said outmost wedge-shaped string thickness being less than said thickness of each of another of said first wedge-shaped strings, wherein the thickness of each of said first wedge-shape strings increases from said outmost wedge-shaped string to said innermost wedge-shaped string, said outmost wedge-shaped string defining at least a portion of one of said filtering apertures and said innermost wedge-shaped string defining at least a portion of another one of said filtering apertures, wherein a dimension of said one of said filtering apertures is greater than a dimension of said another one of said filtering apertures, wherein a minimum size of said filtering apertures is 0.025mm.

17. A wedge filtration media in accordance with claim 16, wherein said second wedge-shaped strings comprise a second outmost wedge-shaped string and a second innermost wedge-shaped string, said second outmost wedge-shaped string having a second outmost wedge-shaped string thickness, and the second innermost wedge-shaped string having a second innermost wedge-shaped string thickness, wherein a thickness of each of said second wedge-shapes strings is less than said second innermost wedge-shaped string thickness and said second outmost wedge-shaped string thickness is less than said thickness of each of said second wedge-shaped strings, wherein the thickness of each of said second wedge-shaped strings increases from said second outmost wedge-shaped string to said second innermost wedge-shaped string.

18. A wedge filtration media in accordance with claim 12, wherein said first wedge-shaped strings comprise an outmost wedge-shaped string having an outmost wedge-shaped string thickness and an innermost wedge-shaped string having an innermost wedge-shaped string thickness, said outmost wedge-shaped string thickness being greater than a thickness of each of another of said first wedge-shaped strings and said innermost wedge-shaped string thickness being less than said thickness of each of another of said first wedge-shaped strings, wherein a thickness of first wedge-shaped strings increases progressively from said innermost wedge-shaped string to said outmost wedge-shaped string, said outmost wedge-shaped string forming at least a portion of a smallest filtering aperture and said innermost wedge-shaped string forming at least a portion of a biggest filtering aperture, wherein a minimum size of said filtering apertures is 0.025mm.

19. A wedge filtration media in accordance with claim 18, wherein said second wedge-shaped strings comprise a second outmost wedge-shaped string having a second outmost wedge-shaped string thickness and a second innermost wedge-shaped string having a second innermost wedge-shaped string thickness, said second outmost wedge-shaped string thickness being greater than a thickness of each of another of said second wedge-shaped strings and said second innermost wedge-shaped string thickness being less than said thickness of each of another of said second wedge-shaped strings, wherein a thickness of second wedge-shaped strings increases progressively from said second innermost wedge-shaped string to said second outmost wedge-shaped string.

* * * * *